United States Patent [19]

Buckley et al.

[11] Patent Number: 5,364,258
[45] Date of Patent: Nov. 15, 1994

[54] APPARATUS FOR MAKING STRUCTURAL REINFORCEMENT PREFORMS INCLUDING ENERGETIC BASTING OF REINFORCEMENT MEMBERS

[75] Inventors: Daniel T. Buckley, Shrewsbury, Vt.; Siegfried W. Horn, DePere, Wis.

[73] Assignee: C.A. Lawton Company, DePere, Wis.

[21] Appl. No.: 22,084

[22] Filed: Feb. 25, 1993

Related U.S. Application Data

[62] Division of Ser. No. 552,253, Jul. 12, 1990, Pat. No. 5,217,656.

[51] Int. Cl.$^5$ .................. B29C 65/14; B29C 63/06; B29C 45/14
[52] U.S. Cl. .................. 425/501; 156/166; 156/272.2; 156/379.6; 264/22; 264/103; 264/136; 264/145; 264/257; 264/DIG. 64; 425/126.1; 425/174.4; 425/296; 425/511
[58] Field of Search .......... 425/174, 510, 511, 174.4, 425/174.6, 296, 297, 289, 544, 123, 501, 126.1; 264/22, 25, 145, 160, 136, 137, 324, 103, 112, 116, 118, 257, 258, DIG. 64, DIG. 65; 156/166, 272.2, 379.6

[56] References Cited

U.S. PATENT DOCUMENTS

| | | | |
|---|---|---|---|
| 3,765,998 | 10/1973 | Oswald et al. | 264/324 |
| 3,878,019 | 4/1975 | Chapman et al. | 264/22 |
| 4,035,215 | 7/1977 | Goldstone | 264/137 |
| 4,042,654 | 8/1977 | Leszyk et al. | 264/160 |
| 4,269,581 | 5/1981 | Ury et al. | 125/174.4 |
| 4,537,823 | 9/1985 | Tsang et al. | 264/137 |
| 4,883,552 | 11/1989 | O'Connor et al. | 264/103 |
| 4,952,366 | 8/1990 | Gelin | 264/137 |
| 5,055,242 | 10/1991 | Vane | 264/137 |
| 5,124,089 | 6/1992 | Ohkoshi et al. | 264/160 |
| 5,169,571 | 12/1992 | Buckley | 264/22 |
| 5,192,387 | 3/1993 | Buckley | 264/22 |

Primary Examiner—Jay H. Woo
Assistant Examiner—Duane S. Smith
Attorney, Agent, or Firm—Hill, Steadman & Simpson

[57] ABSTRACT

A rigid three-dimensional preform is made by moving a plurality of webs of fibrous reinforcement material superposed and coplanar to a cutter, the webs being coated with an electromagnetic energy-curable binder and pressed together. Prior to cutting a blank in a two-dimensional development of the three-dimensional preform from the webs, the webs are tacked together at spaced local zones by locally curing the binder at those zones by locally applying the appropriate electromagnetic radiation (microwave, ultraviolet, electron) so that the webs travel as one to the cutter. After cutting of the blank, the blank is loaded into a mold to replicate the three-dimensional shape of the preform and the remainder of the binder is cured in the mold by the application of the appropriate electromagnetic radiation. An auxiliary member may be attached to the preform by applying an electromagnetic energy-curable binder to at least one location on the preform, moving the auxiliary member into a desired position and intimate contact with the binder-coated location and the binder cured at that location by the application of the appropriate electromagnetic radiation.

18 Claims, 7 Drawing Sheets

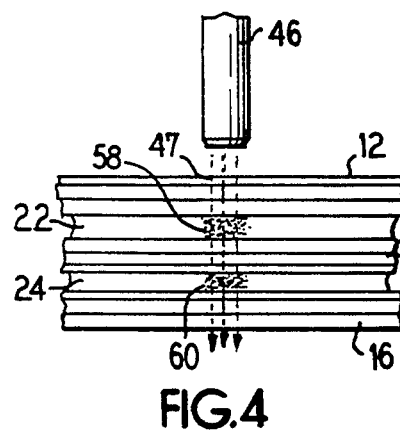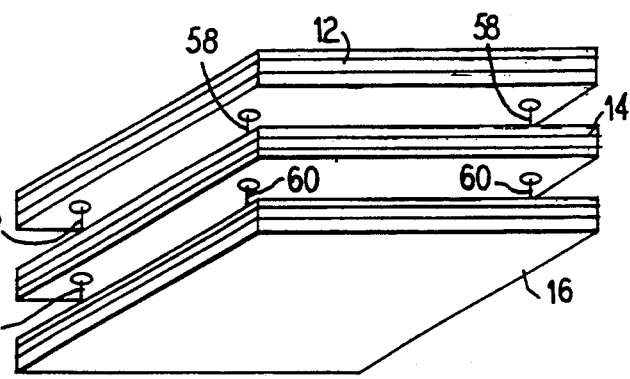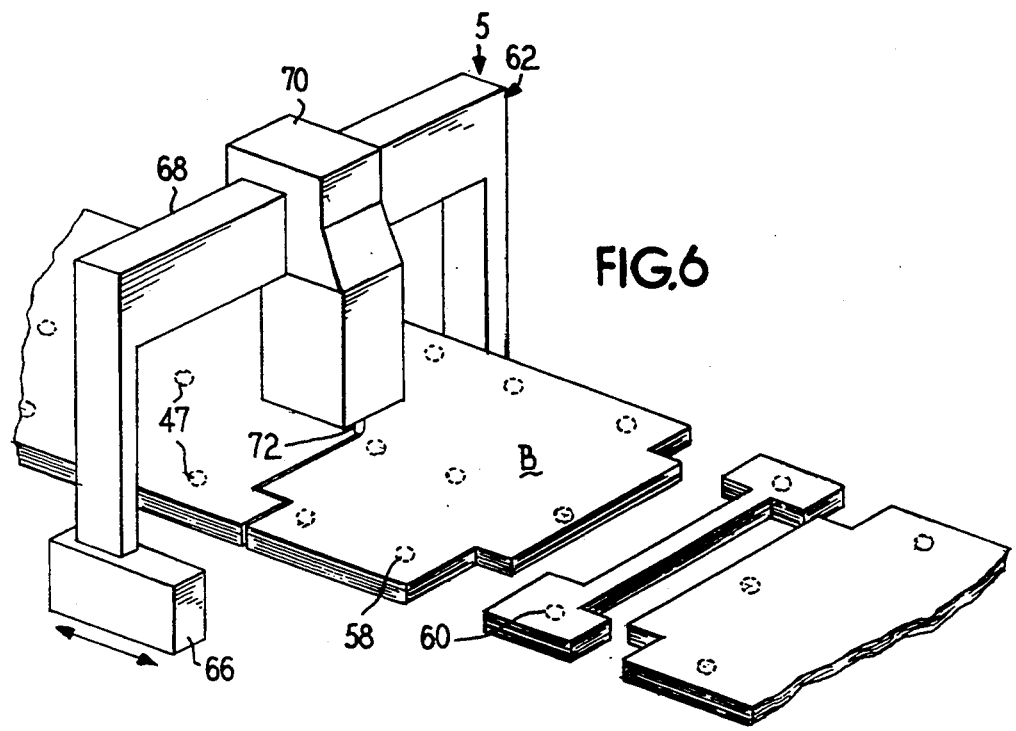

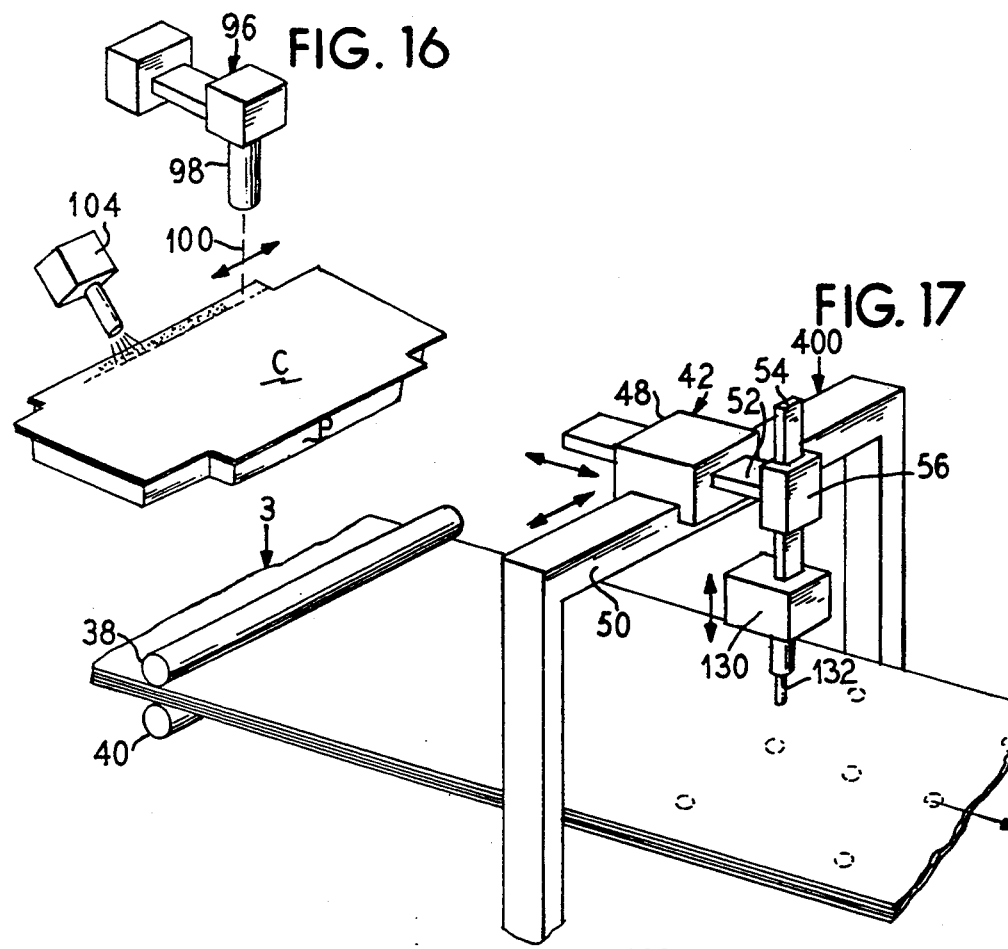
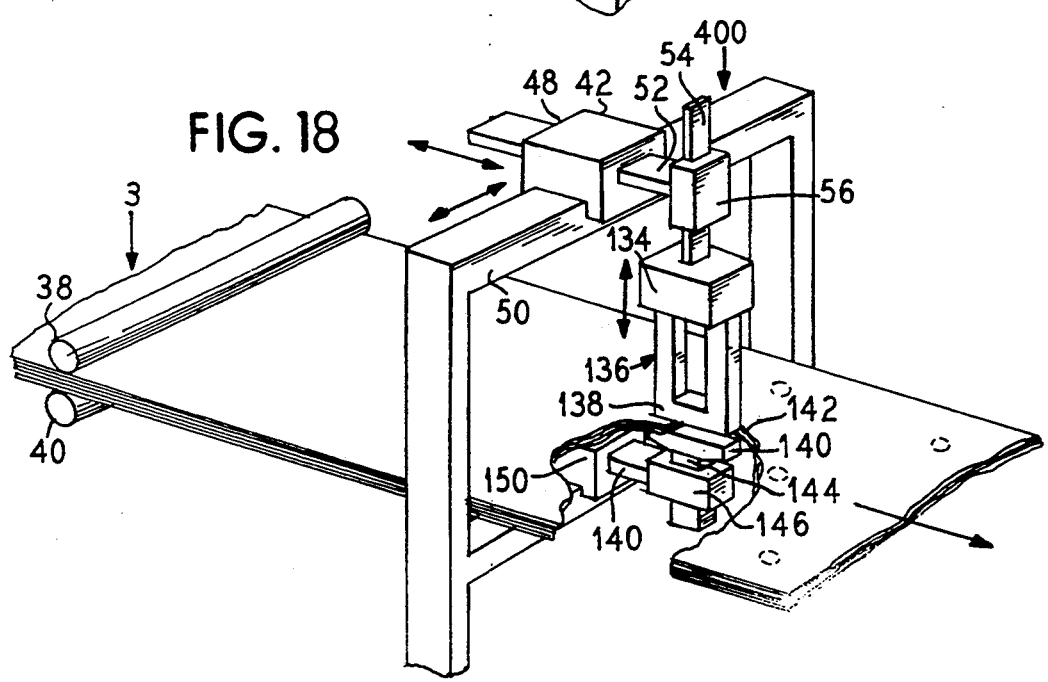

APPARATUS FOR MAKING STRUCTURAL REINFORCEMENT PREFORMS INCLUDING ENERGETIC BASTING OF REINFORCEMENT MEMBERS

This is a division of application Ser. No. 07/552,253, filed Jul. 12, 1990, now U.S. Pat. No. 5,217,656.

CROSS REFERENCE TO RELATED APPLICATION

This application is related to our application Ser. No. 446,859, filed Dec. 6, 1989.

BACKGROUND OF THE INVENTION

1. Field of the Invention

The present invention relates to a method and to an apparatus for making structural reinforcement preforms for resin transform molding (RTM) and reaction injection molding (SRIM) processes for structural composites, and is further particularly concerned with the handling of reinforcement webs used in the process and in attaching reinforcement members and the like as a part or parts of the preforms.

2. Description of the Prior Art

As set forth in our aforementioned patent application Ser. No. 446,859, filed Dec. 6, 1989, in making preforms according to the directed fiber process, it has heretofore been the practice to spray chopped fibers with a binder resin onto a form that has air pulled therethrough to locate and hold the fibers in place. The form with the fibers and the binder resin thereon is then moved into a hot air plenum chamber, dried and/or cured to set the binder resin. In addition, a great deal of processing space is required for drying, curing and cooling the preforms.

In making thermoformed preforms, it is heretofore been the practice to use a continuous strand fiber mat that has been previously coated by the fiber manufacturer with a thermoplastic binder. The thermoformable mat is supplied in a roll form whereby it is unrolled into flat sheets of varied layer thicknesses and clamped into a holding frame at the edges. The frame network is then positioned in an oven chamber containing radiant heaters which slowly heat the reinforcement mat and the thermoplastic binder from both sides. Upon heating, the thermoplastic binder softens and, while soft, the frame network is quickly transferred into a cold mold. The mold closes via a press forcing the reinforcement mat into the desired shape of a part. Upon cooling, the thermoplastic binder stiffens and thus holds the thermoformable mat in its new shape.

As pointed out in our aforementioned patent application, Serial No. 446,859, these processes are slow, require a great deal of space and a large amount of energy.

As also pointed out, in conventional RIM/SRIM process applications for structural components, fiber layer thickness across the entire preform is increased to meet the strength requirements of one area, which results in unnecessary use of material in other areas and increases thickness and weight. Furthermore, neither the directed fiber process nor the thermoformable mat process allows a designer to add ribs or closed sections to maximize design properties.

In our aforementioned application, therefore, we proposed a new system which eliminates the necessity for large rooms and constantly operating ovens, cooled presses and the like and permits design flexibility with respect to the provision of reinforcement ribs, close sections, and reinforcement and/or attachment members while at the same time saving on energy and materials.

Our new process, as disclosed in application Ser. No. 446,859, utilizes specifically-developed binders along with directed energy systems for rigidizing the composite forms and attaching structural components to the preforms and is entirely compatible with RTM and SRIM resin systems, i.e. polyesters, vinyl esters, urethanes, epoxies, phenolics and acrylics. The process is designed to be fully automated and to enable specific distribution and placement of numerous type of reinforcements, where necessary, for the required structural properties of a preform. There is a complete freedom of design inherent in the process and allows for the most desirable reinforcement type and/or structures including closed structural shapes and varied wall sections to meet design criteria.

In the process disclosed in the aforementioned application, mats of reinforcement material are cut into a desired shape as a two-dimensional planar development of a desired preform. The cut mats are then coated with a binder which is responsive to electromagnetic energy, either microwave radiation or ultraviolet radiation, and the cut mats are placed in a three-dimensional mold and pressed to replicate the desired shape of the preform.

While in the mold, the coated and shaped mats are subjected to the appropriate electromagnetic radiation, either microwave or ultraviolet radiation, to cure the binder resin and provide rigidity in a matter of seconds, rather than minutes or hours as with the heat-curable processes. At this point, the preform is a finished product for use in a further molding operation (RTM, SRIM) or may be viewed as a carrier preform for the attachment of structural reinforcement members and the like before being used in a further molding operation (RTM, SRIM).

As a carrier preform, the rigid three-dimensional preform is removed from the mold to a station where a designated area or areas of the preform or of a subassembly (reinforcement rib) are provided with a further coating of an electromagnetic energy curable binder resin, the subassembly (reinforcement member or the like) is moved into intimate contact with the preform at the coated area or areas and the appropriate electromagnetic radiation is applied to energetically stitch (cure the binder) the subassembly to the carrier preform. When the final attachment has been made by such energetic stitching, the preform is a finished product in itself ready for use as a structural reinforcement preform as a part of a further molding process for making a structural composite.

As a structural reinforcement preform the structure is hollow as the walls are permeable to the pressure-applied material during RTM/SRIM processing so that any pocket or chamber could fill with the plastic molding material causing waste, increased weight and longer curing time. Therefore, a core may be inserted in any such pocket or chamber to prevent or at least minimize such an event. The core may be held in place by a subassembly (cover) energetically stitched to the preform.

We have determined that the entire process may be improved, particularly with respect to the handling of the reinforcement material prior to bonding in that a plurality of layers of reinforcement material must be individually cut into the desired shape and individually stacked in registry in the mold. With such layers tacked together prior to cutting (termed energetic basting), so that the cut layers are essentially a single element,-handling is simplified in that registration of the layers is then inherent.

We have also determined that the binder can be applied and the layers tacked together, prior to cutting, so that there is no necessity of later applying binder resin to individual layers after cutting.

We have also determined that the layers of reinforcement material may be drawn as webs from roll goods, the binder resin applied and the webs superposed and tacked together (energetically basted) at spaced local zones prior to cutting by selective curing of such zones with the remaining uncured binder resin available for later curing and rigidizing a shaped element in the mold.

SUMMARY OF THE INVENTION

It is therefore the object of the present invention to provide an improved method and apparatus for making rigid three-dimensional preforms in which the initial material handling and manipulation are different from and simplified with respect to those heretofore known, in which the mats of cut shapes for molding into a rigid three-dimensional form are tacked together and handled as a single mat, and in which the tacking of the webs together is accomplished, prior to cutting, by energetic basting of spaced local zones of superposed webs carrying an electromagnetic energy-curable binder resin, with the remaining uncured binder resin outside of the zones available for later use in the three-dimensional molding process.

Another object of the invention is to provide for the energetic stitching of reinforcement members to the inside and/or outside of the hollow three-dimensional preforms and including the provision of a cover for such a hollow preform, these elements being attached by energetic stitching.

Another object of the invention is to provide for robotic handling of the cut mats and of the preforms and reinforcement elements at the respective locations prior to and after the molding and curing of the preforms.

The above objects are achieved, according to the present invention, in a process in which webs of reinforcement material, such as glass fiber material, are unrolled from roll goods of such material and guided superposed to a pressing or compaction device. Between the supply of roll goods and the pressing or compaction device, at least one surface of each pair of facing surfaces of the superposed webs has an electromagnetic energy curable binder resin applied thereto, as by spraying. In the pressing or compaction device the superposed layers are pressed together to spread and permeate the binder resin into the webs and into greater contact with the fibers thereof. The webs then moves through an energetic basting station where the appropriate electromagnetic energy is applied thereto at selected spaced locations so as to cure the binder resin at corresponding selected spaced zones through the multilayer structure thereby basting or tacking the webs together while leaving large areas or zones of remaining uncured binder resin for subsequent curing during the molding process. Next, the superposed and basted webs are moved to a net shape pattern cutting station at which the multilayer structure is cut into a desired shape which is a two dimensional planar development of the three-dimensional preform. The basting head may also be mounted with the cutting heat and cyclically operated to baste during the cutting process. After cutting, the individual cut mats are picked up by a robot and positioned on a mold plug of the male half of a mold which has a complementary mold cavity in a female half of the mold. The mold is then closed to press the mat into the desired three-dimensional shape of the preform and the mold is then energized with the appropriate electromagnetic energy to cure the remaining binder resin and rigidize the shaped mat into the desired rigid three-dimensional preform.

As mentioned in our aforementioned patent application, Ser. No. 446,859, the mold may comprise in each of its male and female parts, half of a joinable waveguide for directing microwave energy to cure the binder resin. Alternatively, each half of the mold may include an ultraviolet lamp or lamps for curing ultraviolet responsive binder resins. In this case, the mold is constructed, at least at its facing mold surfaces, as a wire screen or from an ultraviolet transmissive material, such as a clear acrylic which does not contain ultraviolet blockers.

After molding, the rigidized three-dimensional preform is removed from the mold and manipulated by robotic devices as a carrier preform for the attachment of reinforcement members. In this part of the process, the carrier preform is oriented to a desired position, a surface area or areas thereof is or are sprayed with a binder resin, such as an ultraviolet curable binder resin, a reinforcement rib or the like is moved into intimate contact with the sprayed area or areas and the sprayed area or areas is or are then illuminated with electromagnetic energy, here ultraviolet energy, to cure the binder resin. The cured binder resin bonds the reinforcement member to the carrier preform. This attaching of reinforcement members, termed energetic stitching, may take place several times to provide reinforcement ribs inside the three-dimensional shape, outside the three dimensional shape on the outer surface thereof and/or to add a cover which closes the hollow three-dimensional structure.

After the final reinforcement member is attached, the preform may be stored or moved to a molding station of an RTM or an SRIM molding process.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 4 is a sectional view taken through an energetic basting location;

FIG. 5 is a somewhat exploded view of three webs which have undergone energetic basting;

FIG. 6 is a perspective view of another portion of the process of FIG. 1 showing the pattern cutting structure;

FIG. 16 is a perspective view of another embodiment of energetic stitching apparatus using ultraviolet energy for attaching the cover to the preform;

FIG. 17 is a perspective view, again beginning at the output of the compaction device, showing another embodiment of the invention in which the energy for energetic basting may be generated by a high-intensity ultraviolet generator or an electron beam gun; and FIG. 18 is a perspective view of another embodiment of the invention beginning at the output of the compaction stage and illustrating energetic basting apparatus in which the energy for energetic basting is supplied by a microwave generator and directed and focused by a split waveguide.

DESCRIPTION OF THE PREFERRED EMBODIMENTS

Figure 1:
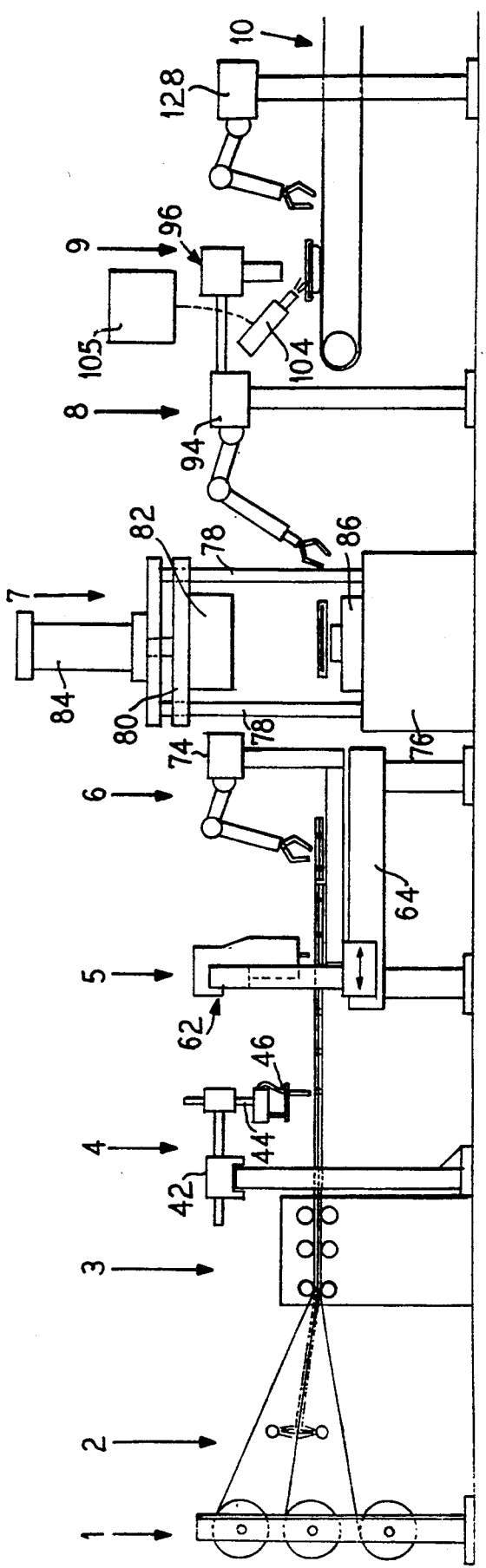
FIG. 1 is an elevation view of the processing stations of one embodiment of an entire preform making process.

Referring to FIG. 1, a process for making rigid three-dimensional preforms is illustrated as comprising a plurality of process stations or stages 1–10.

At the supply stage 1, a plurality of rolls of reinforcement material, such as glass fiber continuous strand, chopped strand, woven fabric mat or the like is mounted for dispensing a like plurality of webs of the material superposed with respect to one another toward a compaction stage 3 where the webs are received, guided and directed coplanar with respect to one another.

Between the supply stage 1 and the compaction stage 3 is a binder application stage 2 in which an electromagnetic radiation-curable binder resin is applied to at least one surface of each pair of facing surfaces of the webs. Here, the binder may be applied to the upper and lower surfaces of the middle web, but may also be applied to the lower surface of the upper web and the upper surface of the lower web or to all of the facing surfaces.

In the pressing or compaction stage 3, the webs are pressed together causing spreading of the binder and permeation of the binder into greater contact areas with the fibers of the webs.

The superposed webs are then fed to an energetic basting station 4 where they are basted or tack welded together at locations spaced longitudinally and transversely of the webs. These spaced locations, as will hereinafter be described, are also considered to be basting zones in that they are three-dimensional and extend to and bind all of the webs.

The webs, basted together to form essentially a single element, are then moved to a net shape pattern cutting stage 5 in which a two-dimensional planar projection or planar development of the three-dimensional desired structure is cut from the web for later forming into the three-dimensional shape of the preform. The shape cut from the multilayer web is hereinafter called a mat and is transferred to a mold stage 7 by way of a material pickup stage 6. At the mold stage 7, the mat is positioned between separable parts of a mold which is then closed causing the mat to assume the contours, i.e. shape, of the three-dimensional preform. At the mold stage 7 and while still in the mold, the shaped mat is subjected to electromagnetic radiation of a type to which the binder resin is sensitive to cure. Upon curing, the shaped mat becomes rigid and is transformed into a rigid three-dimensional preform. Upon opening of the mold, the preform may be removed from the mold stage 7 and transferred to an energetic stitching stage 9 by way of a material handling stage 8, that is if the preform is to be considered a carrier preform for the attachment of reinforcement members or the like. If not, the material handling stage 8 may simply deposit the rigid three-dimensional preform on a conveyor 10 for discharge for storage or for transport to, for example, a resin transfer molding (RTM) process or a reaction injection (SRIM) molding process.

If the preform is to assume the status of a carrier preform, the material handling stage 8 may operate in conjunction with the electromagnetic stitching stage 9 to manipulate the preform into positions as hereinafter described.

In the electromagnetic stitching stage 9, reinforcement members are attached to the carrier preform by spraying an electromagnetic-sensitive binder, as indicated at 104 onto specified locations of the carrier preform and/or the subassembly, the reinforcement rib moved into a desired orientation and into intimate contact with the locations by a material handling device 128 and the locations subjected to electromagnetic radiation by way of an electromagnetic stitching source 96.

There may be a plurality of the material handling devices 128, as needed, in order to handle and stitch a plurality of reinforcement members to the carrier preform.

As indicated on FIG. 1, the material handling stages may comprise a plurality of robots 74, 94, 128 and 105, of which the robot 105 for moving the spray device 104 is symbolically illustrated as connected thereto by mechanical linkage shown by broken lines. Inasmuch as robotics and robotic devices are well known in the art, a detailed explanation thereof is not considered necessary here.

It will be appreciated that the above-described process is continuous and describes a stepped process cycle in which the processing stage with the longest processing time is the controlling stage. Inasmuch as shaping and rigidizing the preform is only a matter of seconds, it is assumed that for most processes, this is not the controlling stage. Depending on the number of reinforcement members added and the nature of the shape of the cut pattern, either of these stages could be considered the controlling stage by which all other processing times and the timing thereof are determined and tailored to the following molding process.

Figure 2:
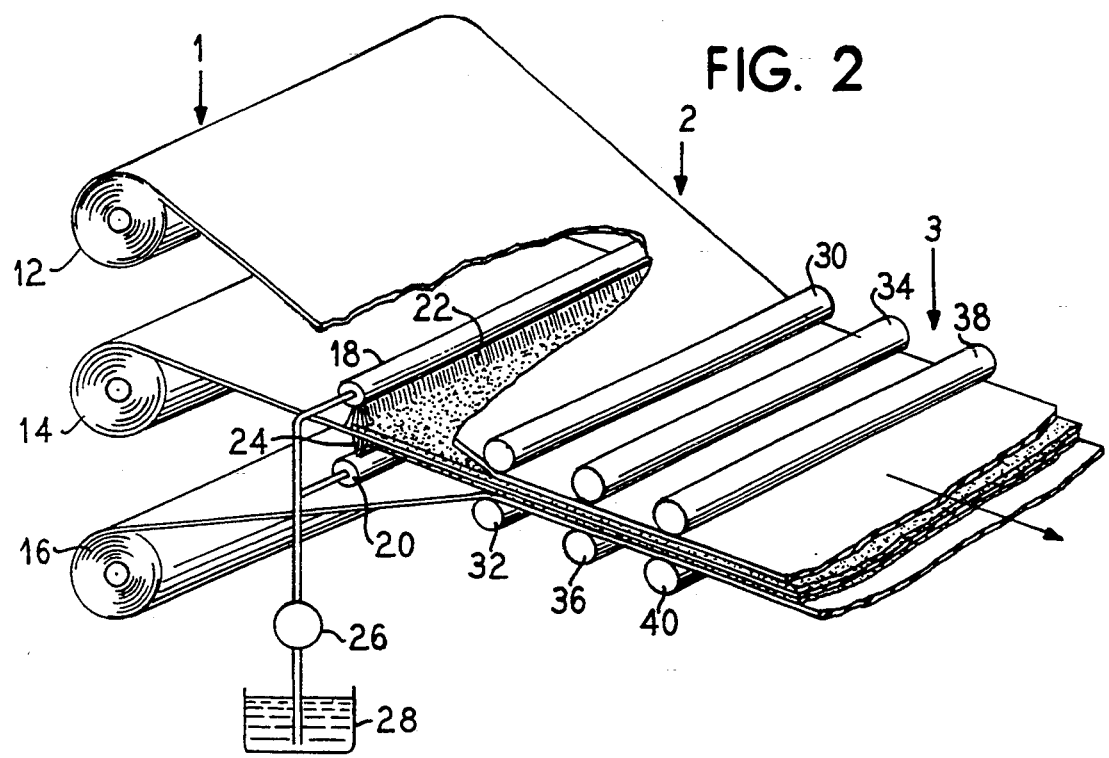
FIG. 2 is a somewhat more detailed perspective view of the reinforcement material supply, binder application and compaction portions of the system of FIG. 1.

Referring to FIG. 2, a more detailed view of the supply stage 1, the binder application stage 2 and the compaction stage 3 is illustrated. The supply stage 1 is illustrated as comprising a plurality of rolls 12–16 of reinforcement material which are to be dispensed as individual webs in a superposed relation toward a predetermined location at the beginning of the compaction stage 3 at which the webs are aligned to travel coplanar with respect to one another. This is accomplished by a pair of opposed press rollers 30 and 32.

The binder resin spray applicator 2 is illustrated as comprising spray mechanisms 18 and 20 which are fed from a reservoir 28 by way of a pump 26 to provide a mist or cloud 22, 24 between the upper web 12 and the center web 14 and between the center web 14 and the lower web 16. The binder spray coats at least one of the facing surfaces of each pair of facing surfaces with binder resin.

As the superposed webs move through the compaction stage 3, pairs of opposed press rollers 30 and 32; 34 and 36; 38 and 40 press the webs together and spread the binder resin for permeation into the webs and to enlarge the contact area thereof with the fibers of the webs.

Figure 3:
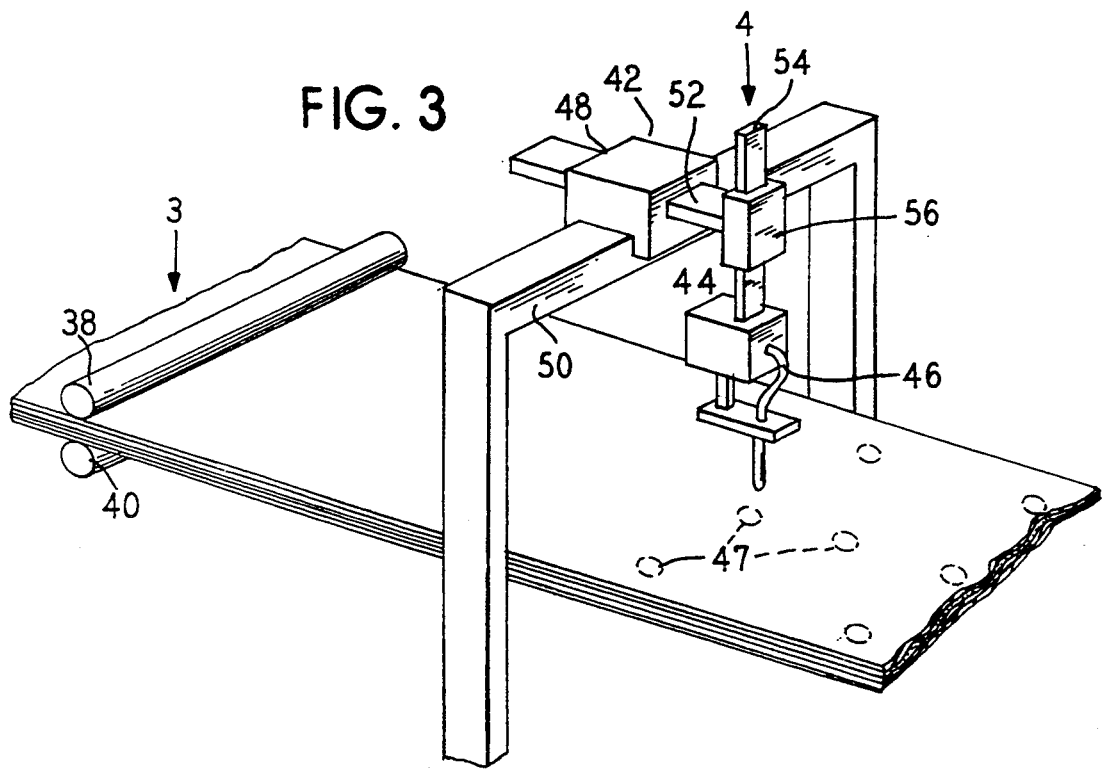
FIG. 3 is a somewhat more detailed view of the process, shown in perspective, from the output of the compaction device and including, in particular, one embodiment of the energetic basting structure.

Referring to FIG. 3, the coplanar multilayer web structure is illustrated as exiting the compaction stage 3 between the press rollers 38 and 40 and entering the energetic basting station 4.

The energetic basting station 4 comprises a gantry 42 including a member 48 which may be driven transversely above the webs on a beam 50, a member 52 which may be moved with respect to the member 48 in the direction of movement of the webs and opposite thereto, a member 56 carried in cantilever fashion at an end of the member 52 and a member 54 which may be driven perpendicular to the webs through the member 56, the member 54 supporting a source, here an ultraviolet source 44 whose ultraviolet emission is conducted by way of a fiber optic ultraviolet wand 46 toward the upper surface of the webs to cause penetration of the ultraviolet light at a plurality of spaced locations 47. The source may be periodically activated or its emission may be periodically gated to provide curing at spaced zones in the longitudinal direction of the webs. The driving and driven members may include rack and pinion type structures.

Turning to FIGS. 4 and 5, a fiber optic wand 46 is illustrated in FIG. 4 as directing ultraviolet radiation toward a location 47 and thereat penetrating through the three webs 12, 14 and 16. The binder applied in FIG. 2 by way of the clouds 22 and 24 is illustrated with the same reference characters in FIG. 4 as being between the webs and penetrated by the ultraviolet radiation which cures the binder resin 22 and 24 in respective zones 58 and 60 to bind the webs together at the spaced locations 47. The same bound structure is illustrated in FIG. 5 with the zones 58 and 60 indicated as strands connecting the webs together. Actually, however, the webs are as one at these locations.

Referring to FIG. 6, the basted webs are illustrated as having moved into the net pattern cutting stage 5 where they are cut into basted multilayer mats or blanks B. The cutting stage 5 may comprise a gantry 62 including a transverse member 68 which is mounted for movement longitudinally of the webs on a member 66 which is supported by a table 64 (FIG. 1). A member 70 is movable transversely on the member 68 and comprises a device for cutting the multilayer webs into the desired shapes. The gantry 62 and the device 70 therefore constitute an X-Y pattern cutter which is effective to cut the desired shapes for the mats or blanks B by way of a cutter 72 which may be constituted, for example, by a knife or a laser beam. As mentioned above, the basting head may be mounted on the gantry 62 and periodically operated to baste the webs together.

As indicated above, the driving structures for the elements 48–56 of FIG. 3 and 64–70 of FIG. 6 may be electric motors with rack and pinion output structures or any other suitable devices for providing X, Y, Z or, respectively, X-Y movements.

Figure 7:
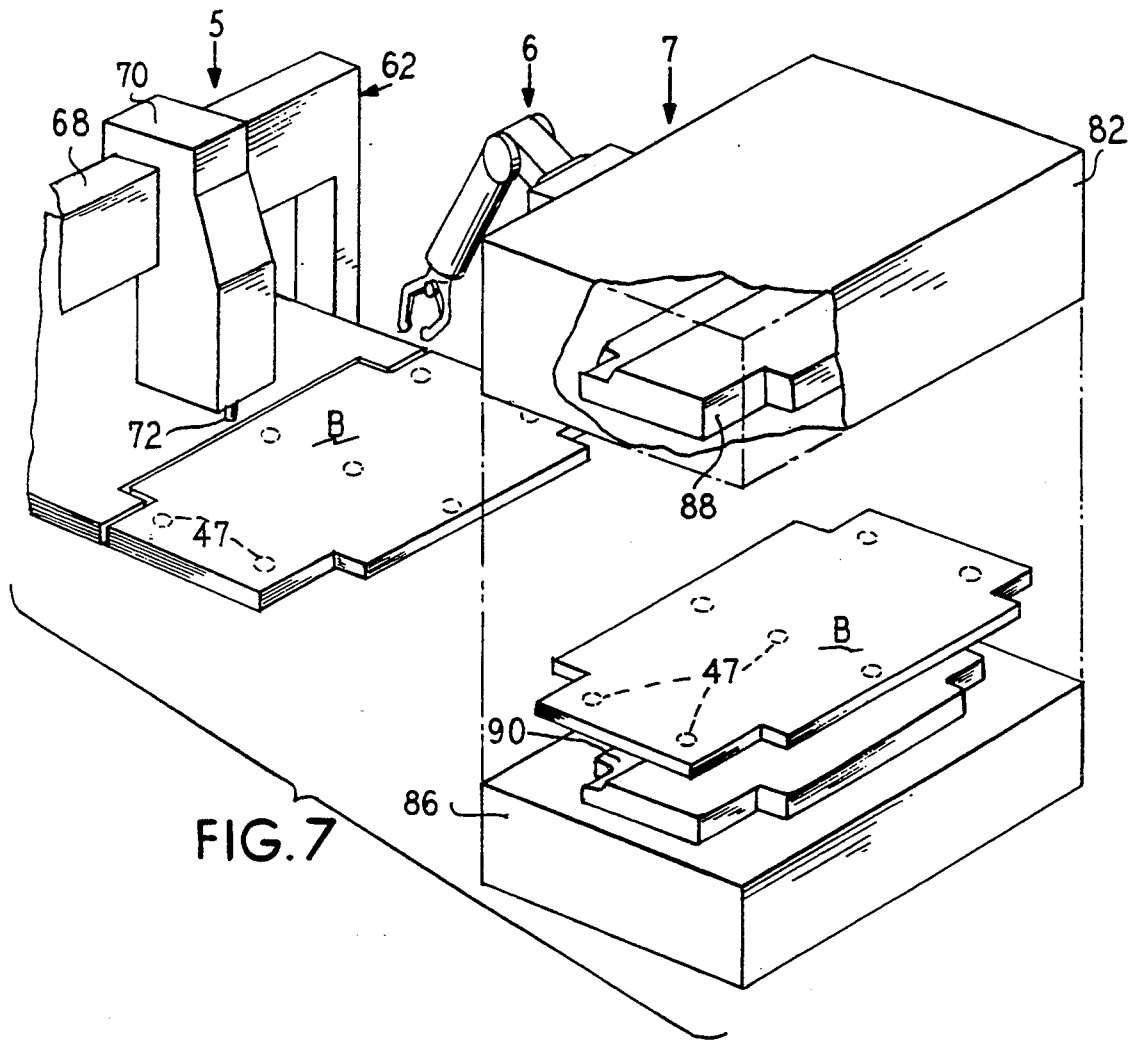
FIG. 7 is a perspective view of another portion of the process of FIG. 1 showing, in particular, the molding apparatus receiving a cut blank from the cutting apparatus.

The cut blanks B are removed from the cutting stage 5 by the material pick up apparatus 74 of the material handling stage 6 and positioned in the mold stage 7. This is shown in greater detail in FIG. 7 in which a cut blank B has been positioned over a lower shaping mold 86 which includes a male mold plug 90 and which is below and in registry with an upper shaping mold 82 which includes a female mold cavity 88 generally conforming to the shape of the male mold plug 90. As shown, another blank B is being cut at the cutting station 5 and the robot 74 has returned to handle that next blank B.

Figure 8:
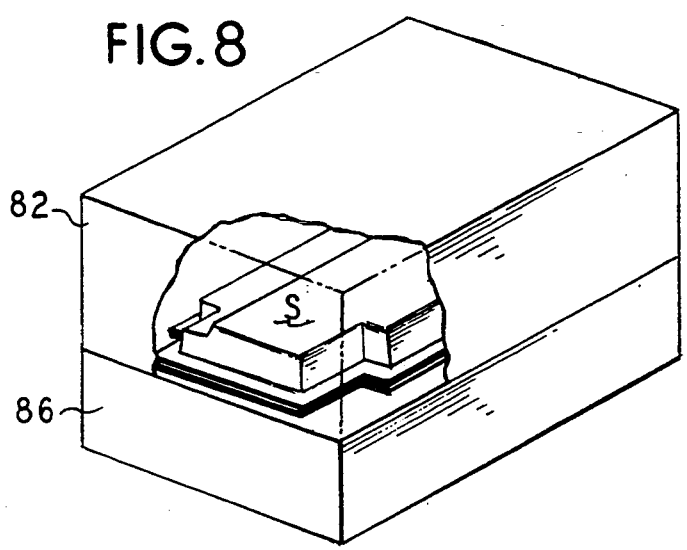
FIG. 8 is a perspective view showing the mold in a closed condition with the cut blank formed into the desired shape.

The mold is then closed by operating the ram 84 to lower the crossbar 80 and the upper mold 82 to mate the upper and lower shaping mold parts, as shown in FIG. 8, so that the blank B now assumes the character of a three-dimensional shaped element S which conforms to the desired shape of the rigid three-dimensional preform.

Figure 9:
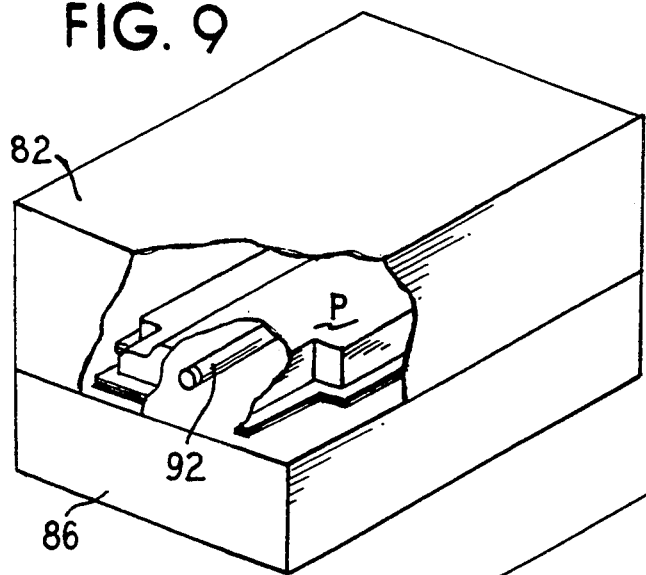
FIG. 9 is a perspective view, shown partially cut away, similar to FIG. 8 and further illustrating the provision of high-intensity ultraviolet radiation.

While the mold is closed, and as specifically illustrated in FIG. 9, the shaped element S is subjected to electromagnetic radiation, here in the form of high-intensity ultraviolet radiation to cure the remaining binder resin which was not cured during energetic basting at the energetic basting stage 4. In order to provide the ultraviolet radiation, at least the facing walls of the molds 82 and 86 are formed with an ultraviolet transmissive material, such as a wire grid or a clear acrylic. In addition to the single lamp 92 illustrated in FIG. 9, a plurality of such lamps may be provided in the male mold plug and/or peripherally about the female mold cavity. After curing, the molded element is a rigid three-dimensional preform P which may be moved from the mold stage 7 and deposited on the conveyor 10 to transport the same for storage or for use in a further molding process as set forth above.

Figure 10:
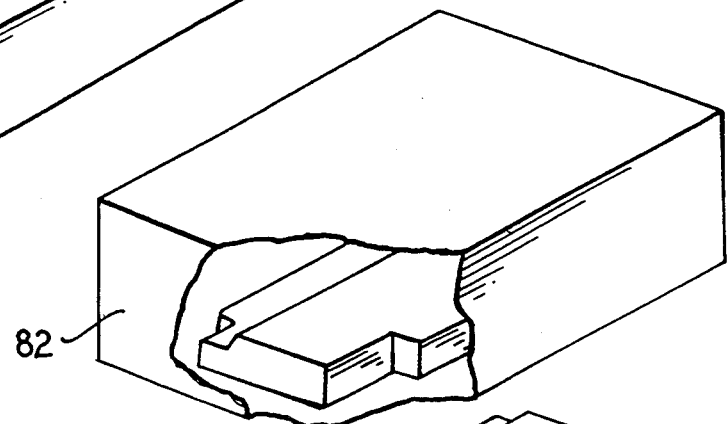
FIG. 10 is a perspective view showing the mold in an open condition with the rigid shaped preform removed from the mold and ready for transport for subsequent processing.

Referring to FIGS. 1 and 10, in order to remove the preform P, the ram 84 is operated to raise the crossbar 80 and the upper mold 82 to separate the mold 82 from the mold 86. The robot 94 may then pick up the preform P, as illustrated in FIG. 10, to move the preform P either to the conveyor 10 or to the energetic stitching station 9.

Figure 11:
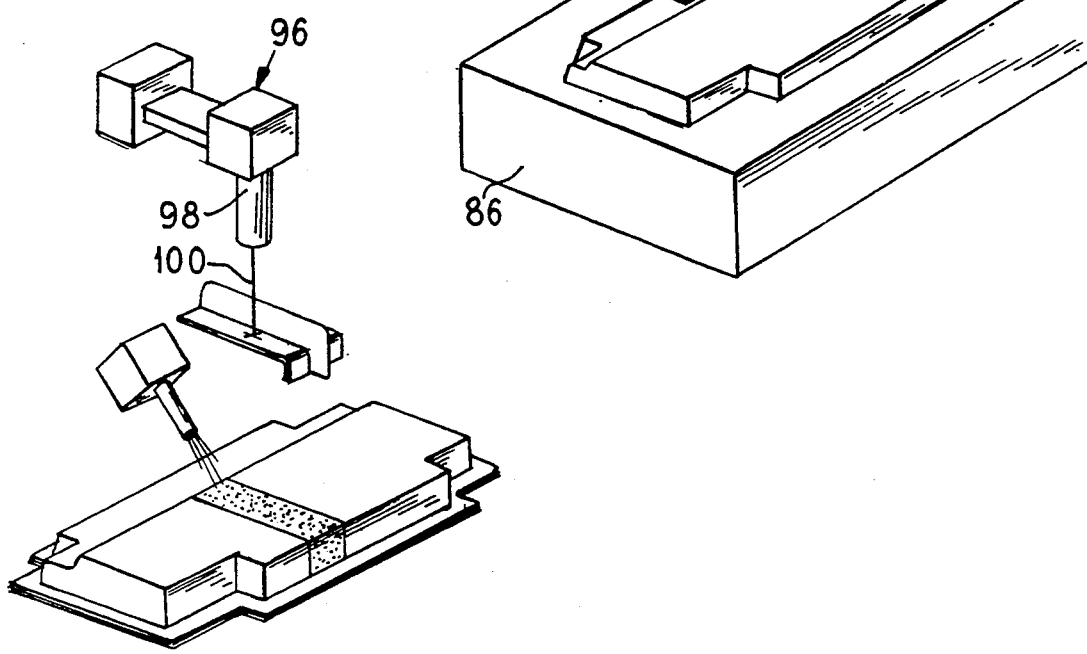
FIG. 11 is a perspective view of a portion of the process of FIG. 1 illustrating one embodiment of energetic stitching of an outer reinforcement rib to the preform of FIG. 10 by ultraviolet techniques in which the binder is applied to the preform; alternatively it could be applied to the rib.

Assuming that the preform P is now considered to have the status of a carrier preform, the preform P is moved to the energetic stitching stage 9 (FIG. 1). At this station, the robot 94 of the material handling stage 8 may hold the preform P in the position illustrated in FIG. 11. While in this position, a robot 105 manipulates a binder applicator 104 to spray and electromagnetic energy-curable binder on an area 102 at a location at which an external reinforcement rib ER is to be attached and/or on the matching surface of the reinforcement rib. Then, a robot 128 (FIG. 1) or another suitable manipulator orients the member ER into position transversely of the preform P and into intimate contact with the sprayed area 102. Then, a robot 96 positions an electromagnetic stitcher into place which in FIG. 11 is constituted by an ultraviolet generator 98 for producing an ultraviolet beam 100, and to direct the same onto an area 106 or, preferably, a plurality of such areas along the rib ER, to cure the binder thereat and energetically stitch the rib ER to the preform P.

Figure 12:
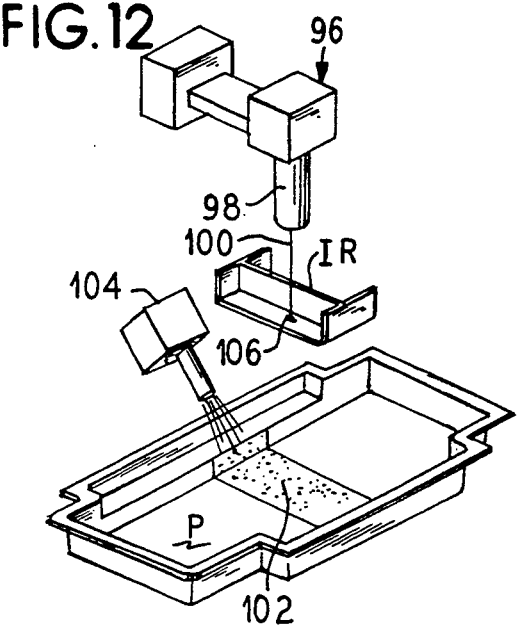
FIG. 12 is a view of energetic stitching apparatus similar to that of FIG. 11, but showing the energetic stitching of an internal reinforcement rib by ultraviolet techniques.

The robot 94 may then rotate the preform P 180° and the same steps then performed for an internal reinforcement rib IR to energetically stitch the same with the cavity of the carrier preform P. As shown in FIG. 12, this is an almost identical operation to that shown in FIG. 11 for the external rib ER. The robot gantry 96 may be moved, in either case, to scan along the length of the rib and energetically stitch the respective rib to the carrier preform at a plurality of the locations 106.

Alternatively or in addition to the internal rib IR being applied, the robot 105 may manipulate the binder spray device 104 to spray an elongate area along the inner surface of the carrier preform P and/or a matching surface of the internal rib IR. In this case, the robot 128 or similar manipulator picks up and moves an appropriate shaped elongate internal reinforcement member LIR into intimate contact with the preform P at the sprayed area and the ultraviolet beam 100 scans that area or a plurality of locations 106 thereof for stitching the member LIR to the interior of the carrier preform P.

Figure 13:
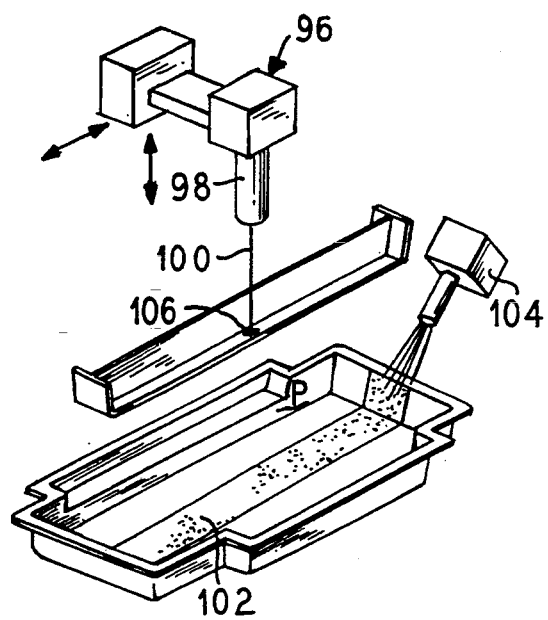
FIG. 13 is another perspective view of energetic stitching apparatus, similar to that of FIGS. 11 and 12, showing the energetic stitching of an elongate internal longitudinal reinforcement rib by ultraviolet techniques.
Figure 14:
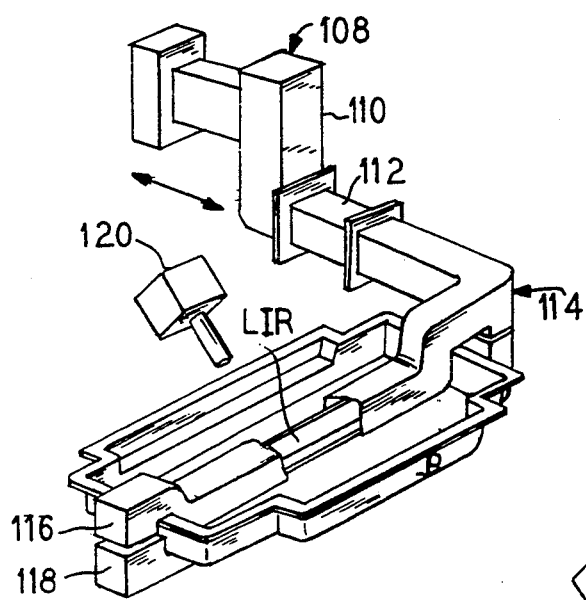
FIG. 14 is a view similar to that of FIG. 13 and showing the energetic stitching of the elongate internal reinforcement rib by way of microwave techniques.

As an alternative embodiment, reference taken to FIG. 14 which illustrates the same basic structure as FIG. 13, with the exception of the application of the electromagnetic energy. In FIG. 14, the robot 105 manipulates a binder spray device 120 which sprays a microwave-sensitive binder along the area 102 and/or a matching area on the rib LIR, the robot 128 positions the rib LIR into intimate contact with the preform P at the sprayed area and microwave energy is supplied from a robot manipulated device 108 carrying a microwave generator 110 which is coupled at 112 to a split waveguide 114 including an upper waveguide section 116 and a lower waveguide section 118. As shown, the waveguide sections 116 and 118 together form a single waveguide shaped to conform to the shape of the carrier preform P with the reinforcement rib LIR in place and some mechanism robot or the like (not shown) must be provided to open and close the waveguide 114.

Figure 15:
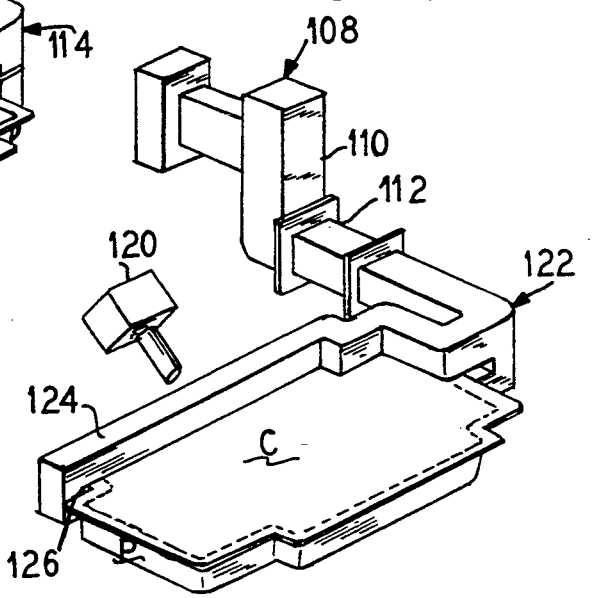
FIG. 15 is a perspective view of another embodiment of energetic stitching using microwave techniques showing the addition and stitching of a cover for closing the hollow preform.

Sometimes it is desirable to close the hollow structure of the preform or of the carrier preform P including any core material therein to block filling with resin during the following molding process. In this case, and as shown in FIGS. 1 and 15, the robot 128 or similar manipulator picks up a cover C and positions the same in registry with the preform P. The robot 94 and possibly additional robots may then grasp and position a portion of the edges of the assembly, after spraying the marginal edge or flange of the preform P and/or of the cover C with a microwave-sensitive binder resin, into a slotted waveguide 122 having an upper section 124 and a lower section 126. The carrier preform has now been stitched closed and may include core material and/or one or more internal reinforcement ribs of the type illustrated in FIGS. 12 and 13. In addition, it may include or be manipulated and stitched to include one or more external ribs ER of the type illustrated in FIG. 11.

FIG. 16 illustrates a similar cover stitching procedure in which the binder spray 104 is manipulated to spray ultraviolet-sensitive binder resin along the marginal edge or flange of the preform P and/or a cover C and the cover C is manipulated into proper position and the two elements are stitched together with an energetic stitching head 98 which is positional by way of the gantry 96 to stitch around the entire periphery of the assembly.

As mentioned above, the energetic basting and stitching procedures, in fact all such attachment procedures, may be performed by various types of radiating elements, including microwave, ultraviolet and electron gun.

Referring now to FIG. 17, an energetic basting station 400 is illustrated at the output of the compaction stage 3. The energetic basting station 400, in this embodiment, comprises a gantry 42 having the same structure as that illustrated in FIG. 3 with the exception that the fiber optic wand 46 is not employed. Here, an ultraviolet laser 130 is excited to emit an ultraviolet laser beam 132 for curing the binder at the spaced locations 47.

In place of the ultraviolet laser generator, an electron gun could be employed, assuming the binder resin would be curable (free electron bonding) in response to the electron beam.

Another embodiment of energetic basting is illustrated in FIG. 18 at an energetic basting station 4000 located at the output of the compaction stage 3. Here again, the gantry 42 is illustrated and operates in the same manner as that of FIG. 3 to position an energetic basting applicator in three coordinate directions. In this embodiment, however, the source of electromagnetic energy is a source 134 of microwave energy which is coupled to a waveguide 136 having an upper section 138 and a lower section 140. The lower section 140 is carried by a member 144 which is vertically movable in an actuator 146 carried by a member 140a which is longitudinally movable in an actuator 150 carried on a transverse beam 152, mounted parallel to the beam 50, but below the webs on the gantry 42.

In summary, the present invention provides a process for making rigid three-dimensional preforms using reinforcement materials such as glass fiber webs coated with a binder resin. The webs are drawn from respective rolls of reinforcement material and superposed and directed such that they travel toward a common location at which they are guided so as to travel parallel with respect to one another. Before becoming parallel, the superposed webs have a binder resin of electromagnetic energy-curable material applied, as by spraying, to at least one surface of each pair of facing surfaces and, after becoming parallel, are pressed together to distribute the binder resin and increase the contact area thereof with the fibers of the reinforcement material. The binder resin cures in response to the application of a selected electromagnetic energy, such as microwave energy, ultraviolet energy or electron beam energy. After being pressed together, the webs travel to an energetic basting station where the selected electromagnetic energy is applied to spaced zones through the multilayer web structure to bind those zones and tack the webs together so that they proceed as they were a single web. The electromagnetic basting may occur through the application of the selected energy by way of an ultraviolet wand, and ultraviolet laser, microwave via a split microwave waveguide or an electron beam gun. Next, the basted web is cut into mats having shapes each corresponding to a two-dimensional planar development of the three-dimensional shape of the desired rigid three-dimensional preform. A cut mat is then transferred to a mold where it is formed into the three-dimensional shape of the preform between complementary-shaped upper and lower molds. The molds are constructed of material which is transmissive to the selected electromagnetic energy and are operable therewith to cause curing of the uncured binder resin remaining after basting of the spaced zones and to cause the shaped mat to become rigid, thus resulting in the desired rigid three-dimensional preform. At this time, the preform may be utilized in a further molding process or may be considered as a carrier preform to which a subassembly or subassemblies (reinforcement elements and/or mounting members) are energetically stitched by applying an electromagnetic energy curable binder resin to a selected location or locations, moving the subassembly into intimate contact with the preform at those selected locations on the preform and/or on the subassembly and applying selected electromagnetic radiation to those locations to cure the binder and attach the reinforcement member. These last steps may be multiplied or repeated to attach a plurality of subassemblies including a cover member which closes the hollow shaped of the preform to hold a core therein. After all of the reinforcement and/or mounting members are attached, the resulting preform may be transferred to a further molding process.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for making a rigid three-dimensional preform, comprising:
    means for moving a plurality of webs of fibrous reinforcing material along respective paths and guiding the webs superposed such that they superpose coplanar to extend parallel to one another and travel parallel to and in contact with one another;
    means applying an uncured electromagnetic energy-curable binder to at least one surface of facing surfaces of the webs;
    means for pressing the parallel contacting, moving webs together to spread the binder and increase the permeation thereof into the webs;
    means for locally applying electromagnetic radiation into selected spaced locations of the pressed contacting webs to cure the binder and thereby tack the webs together at said selected spaced locations;
    means for cutting blanks of a predetermined shape from the webs of fibrous reinforcing material;
    means for forming the blank into a desired three-dimensional shape of the preform; and
    means for applying electromagnetic radiation to the shaped blank to cure the remaining uncured binder and rigidize the shaped blank into the desired rigid three-dimensional preform.

2. Apparatus for making rigid three-dimensional preforms, comprising:
    a source of reinforcement material, said source including a plurality of rolls of the reinforcement material to be dispensed from said rolls toward a predetermined location as a plurality of converging superposed webs;
    a binder station intermediate said source and said predetermined location for applying an electromagnetic energy-curable binder to at least one surface of each pair of facing surfaces of the moving superposed webs;
    pressing means receiving and drawing the webs from said source and including guide means at said predetermined location for guiding said plurality of moving webs to move together parallel to one another and pressing adjacent webs into intimate contact to spread the binder and improve the permeation thereof into the webs;
    energetic basting means for receiving and tacking said plurality of moving webs together, including electromagnetic energy means for radiating and curing the binder in spaced local zones through the superposed webs and tacking the same together at said local zones;
    cutting means for receiving the tacked webs from said energetic basting means and cutting individual mats therefrom each shaped as a two-dimensional planar development of the desired preform;
    molding means including a mold operable to receive and press the individual mats into the desired three-dimensional preform shape, and electromagnetic radiation means coupling electromagnetic energy into said mold to cure the remaining uncured binder and rigidize the shaped structure; and
    material handling means for moving the individual mats from said cutting means and into said mold.

3. The apparatus of claim 2 wherein:
    the binder station applies an ultraviolet energy-curable binder; and
    said electromagnetic energy means comprises ultraviolet wave generation means.

4. The apparatus of claim 3, wherein:
    said ultraviolet wave generation means comprises at least one ultraviolet lamp.

5. The apparatus of claim 2, wherein:
    the binder station applies a microwave energy-curable binder; and
    said electromagnetic radiation means comprises microwave generation means.

6. The apparatus of claim 5, wherein:
    said electromagnetic energy means comprises a split waveguide coupled to said microwave generator and receiving the superposed moving webs therethrough.

7. Apparatus for making a hollow rigid three-dimensional preform as a carrier preform and attaching at least one auxiliary member thereto, comprising:
    a source of glass fiber reinforcement material, said source including a plurality of rolls of the reinforcement material which is dispensed toward a predetermined location from said rolls as a plurality of converging superposed webs;
    binder applying means intermediate said source and said predetermined location for applying an ultraviolet energy-curable binder to at least one surface of each pair of facing surfaces of the moving superposed webs;

pressing means receiving and drawing said webs including guide means at said predetermined location for guiding said plurality of moving webs to move together parallel to one another and pressing adjacent ones of the webs into intimate contact to spread the binder resin and improve contact thereof with the fibers of the webs;

energetic basting means for receiving and tacking said plurality of moving webs together, including ultraviolet radiation means for radiating and curing spaced local zones through the superposed webs of glass fiber reinforcement material thereby tacking the same together in said spaced local zones;

cutting means for receiving the tacked webs from said energetic basting means and cutting an individual multilayer mat therefrom shaped as a two-dimensional planar development of the desired preform;

molding means including a mold operable to receive and press the individual mats into the desired three-dimensional preform shape, and ultraviolet radiation means coupling ultraviolet radiation into said mold to cure the remaining uncured binder resin and rigidize the molded structure;

material handling means for moving the individual mats from said cutting means and into said mold; and energetic stitching means for attaching the at least one auxiliary member to the preform, said material handling means comprising material manipulation means for orienting the preform into a predetermined position, and said energetic stitching means comprising further binder applying means for applying ultraviolet energy-curable binder to at least one selected location on the preform, means for moving the at least one auxiliary member, means for moving the at least one auxiliary member into a desired position and into intimate contact with the preform at the least one selected ultraviolet radiation to said at least one selected area to cure the binder thereat and attach the at least one auxiliary member to the preform.

8. Apparatus for making a rigid three-dimensional reinforced preform comprising:
means forming a rigid preform of a desired shape;
means applying a binder curable by the application of ultraviolet energy to the preform;
means applying a reinforcement member to the preform; and
means applying ultraviolet energy to the binder at predetermined selected locations to stitch the reinforcement member to the preform joining the preform and reinforcement member rigidly.

9. Apparatus for making a rigid three-dimensional reinforced preform constructed in accordance with claim 8:
wherein said means for applying binder applies the binder at predetermined selected locations to the preform;
and said means for applying ultraviolet energy applies the energy to the binder at said locations to stitch the reinforcement member to the preform.

10. Apparatus for making a rigid three-dimensional reinforced preform comprising:
means forming a rigid preform of a desired shape;
means applying a binder curable by the application of electromagnetic radiation to the preform;
means applying a reinforcement member to the preform; and
means applying electromagnetic radiation the binder at predetermined select locations to stitch the reinforcement member to the preform joining the preform and reinforcement member rigidly.

11. Apparatus for making a rigid three-dimensional reinforced preform constructed in accordance with claim 10:
wherein said means for applying binder applies the binder at predetermined select locations to the preform;
and said means for applying electromagnetic radiation applies the radiation to the binder at said locations to stitch the reinforcement member to the preform.

12. An apparatus for the attachment of members to preforms comprising the combination:
means for applying an electromagnetic energy-curable binder at a binder area to at least one of the areas of a carrier preform or to a member where the preform and member are to be attached;
means positioning the preform and member in an oriented location into intimate contact at said binder area; and
positioning an electromagnetic stitcher having a microwave energy output and directing electromagnetic energy to said binder area to energetically stitch and attach said preform and said member.

13. An apparatus for the attachment of a member to a preform constructed in accordance with claim 12:
wherein said applying means applies an ultraviolet energy-curable binder and said stitcher has an ultraviolet energy output and directs ultraviolet energy to said binder area to energetically stitch and attach said preform and said member.

14. An apparatus for the attachment of a member to a preform constructed in accordance with claim 13:
wherein said applying means directs said binder in a spray to apply said binder to the binder area.

15. An apparatus for the attachment of a member to a preform constructed in accordance with claim 13:
wherein said applying means applies the binder at a plurality of binder areas between the preform and the member.

16. An apparatus for the attachment of a member to a preform constructed in accordance with claim 13:
wherein said stitcher has a movable support to scan the binder area for energetically stitching and attaching the member to said preform.

17. An apparatus for the attachment of a member to a preform constructed in accordance with claim 13:
wherein said stitcher is shaped to conform to the shape of the carrier preform.

18. An apparatus for the attachment of a member to a preform constructed in accordance with claim 13:
wherein said applying means applies said binder along a marginal edge of the carrier preform.

* * * * *